No. 785,691. PATENTED MAR. 21, 1905.
C. O. WYMAN.
HARVESTER REEL.
APPLICATION FILED NOV. 6, 1903.
4 SHEETS—SHEET 1.
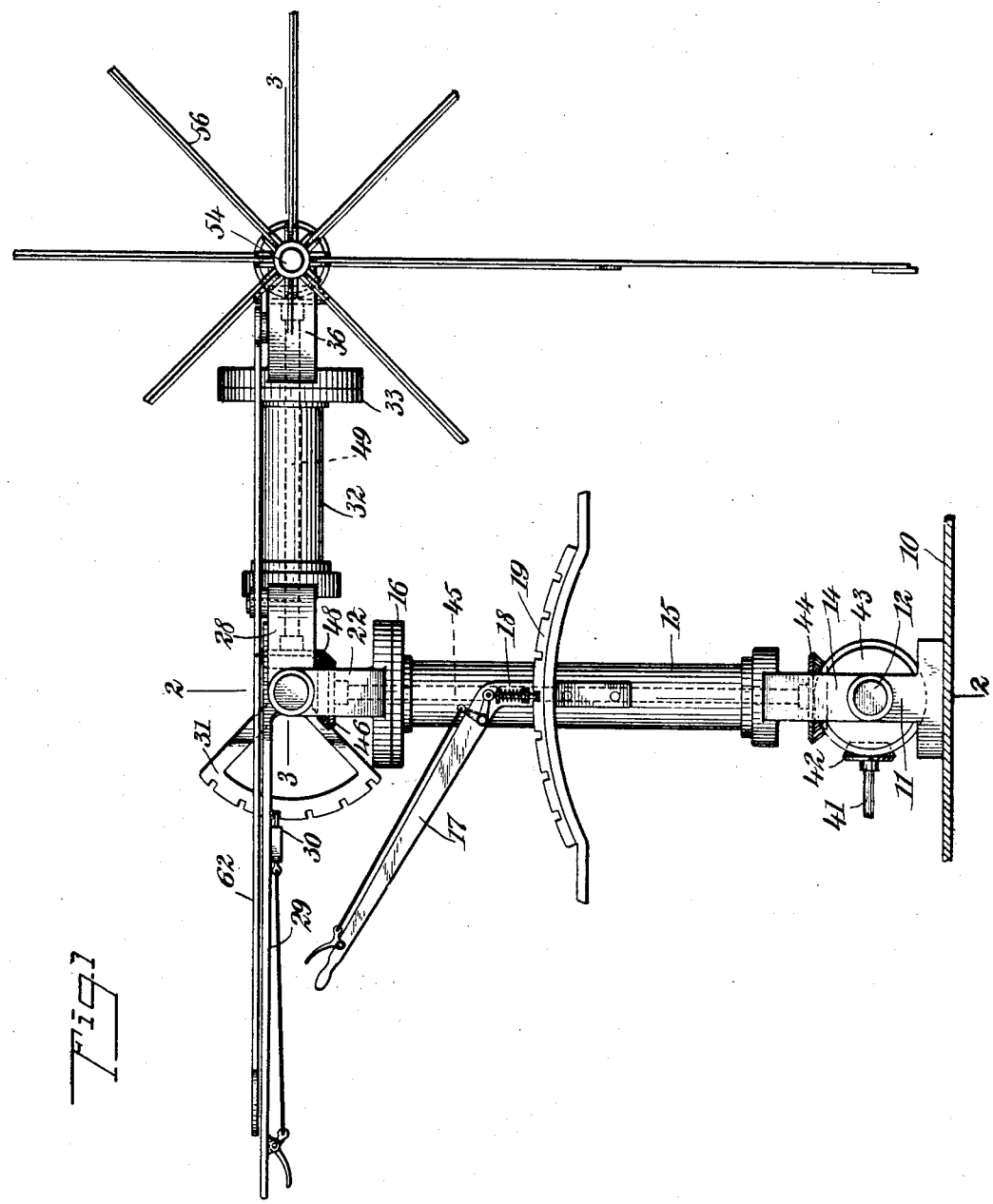
WITNESSES.
INVENTOR
Charles O. Wyman
BY
ATTORNEYS

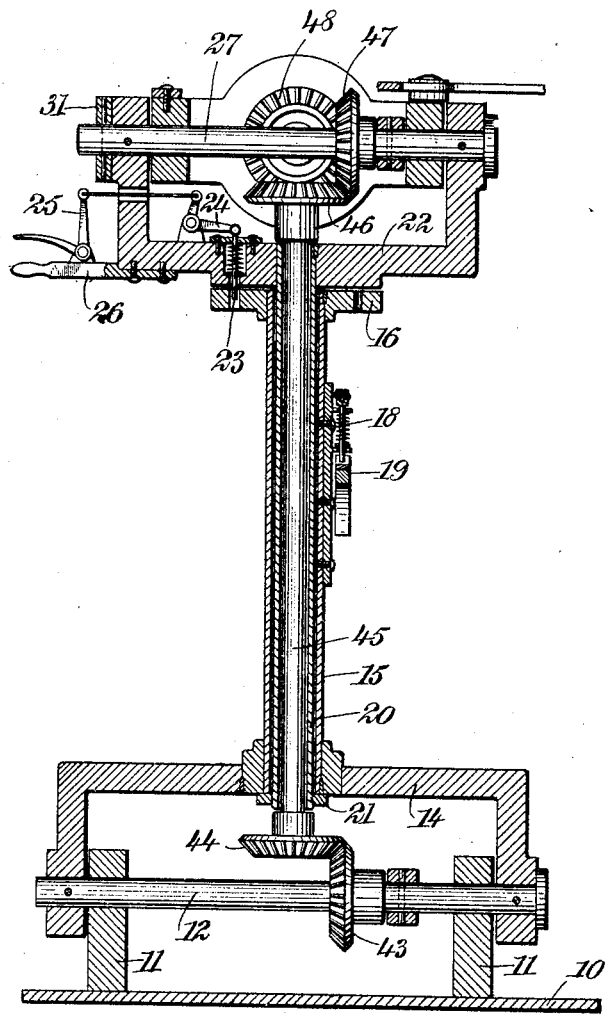

No. 785,691. PATENTED MAR. 21, 1905.
C. O. WYMAN.
HARVESTER REEL.
APPLICATION FILED NOV. 6, 1903.
4 SHEETS—SHEET 3.
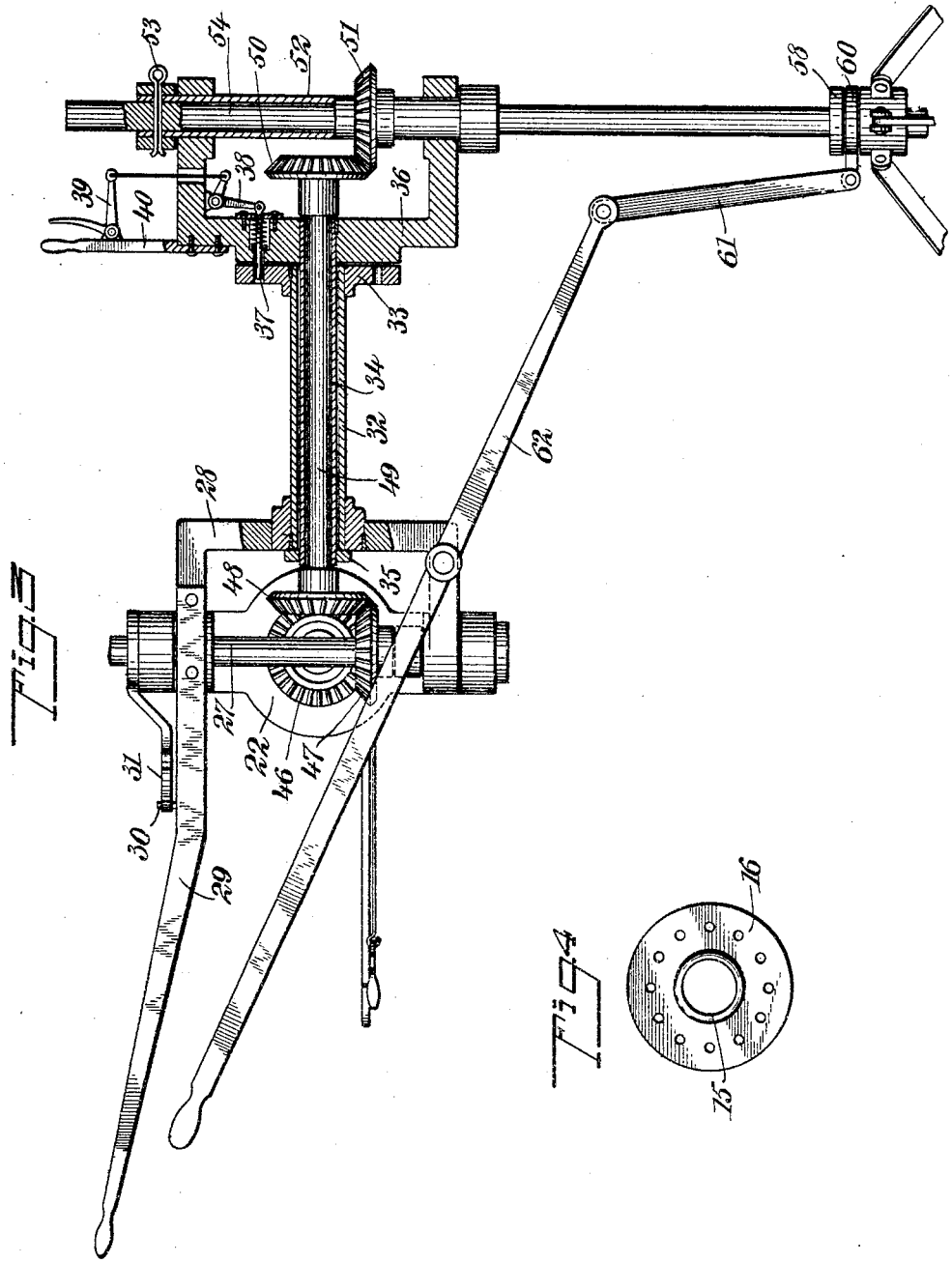
WITNESSES:
J. A. Brophy
Isaac B. Owens.
INVENTOR
Charles O. Wyman
BY
ATTORNEYS No. 785,691. PATENTED MAR. 21, 1905.
C. O. WYMAN.
HARVESTER REEL.
APPLICATION FILED NOV. 6, 1903.
4 SHEETS—SHEET 4.
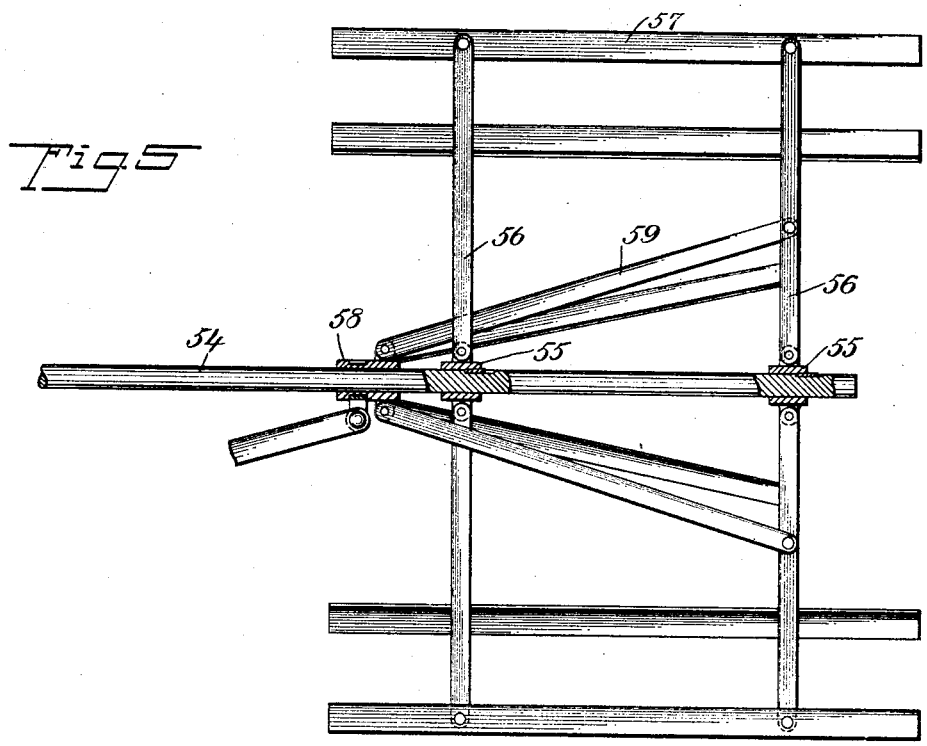
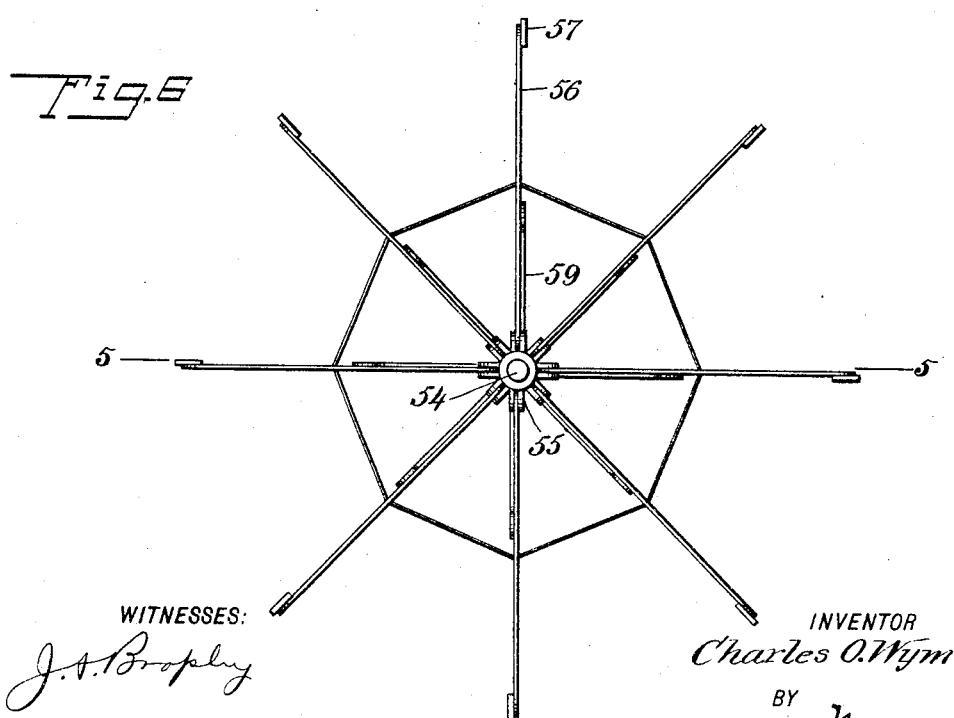
WITNESSES:
J. A. Brophy
Isaac B. Owens.
INVENTOR
Charles O. Wyman
BY
Munn
ATTORNEYS No. 785,691.

Patented March 21, 1905.

UNITED STATES PATENT OFFICE.

CHARLES O. WYMAN, OF ANOKA, MINNESOTA.

HARVESTER-REEL.

SPECIFICATION forming part of Letters Patent No. 785,691, dated March 21, 1905.

Original application filed July 1, 1903, Serial No. 163,872. Divided and this application filed November 6, 1903. Serial No. 180,050.

*To all whom it may concern:*

Be it known that I, CHARLES O. WYMAN, a citizen of the United States, and a resident of Anoka, in the county of Anoka and State of Minnesota, have invented a new and Improved Harvester-Reel, of which the following is a full, clear, and exact description.

This invention relates to a grain-reel for harvesters of all sorts, but particularly for self-binding harvesters.

The primary object of the invention is to provide a reel which may be readily folded into compact form for shipment and which also may be freely adjusted in all directions when in use for the double purpose of adapting the reel to the condition of the grain and lay of the land while operating and for folding the reel closely against the body of the harvester when the same is being drawn to and from the field.

This application is a division of my previous application filed July 1, 1903, Serial No. 163,872.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side elevation of the invention. Fig. 2 is a vertical section on the line 2 2 of Fig. 1. Fig. 3 is a plan view with parts in section on the line 3 3 of Fig. 1. Fig. 4 is a detail view of the orificed disk for holding the reel in one of its adjustments. Fig. 5 is a plan view of the reel with parts broken away, and Fig. 6 is an end elevation of the reel.

10 may be taken to represent a part of the harvester-framing, on which my improved reel is mounted and by which it is supported. On said support 10 are mounted two boxes 11, which carry loosely a horizontal shaft 12. To the ends of said shaft are fixed the arms of a yoke 14 so that said yoke may swing around the axis of the shaft 12. Fastened securely to the yoke 12 and projecting upward therefrom is a sleeve 15, carrying rigidly at its upper end the orificed disk 16. (Best shown in Fig. 4.) Said sleeve 15 has an arm 17, on which is mounted a hand-operated spring-pawl 18, coacting with a toothed quadrant 19, suitably mounted independently of the sleeve 15. In this manner the sleeve 15 may be held rigidly in a vertical position or at any inclination thereto within the limits of the quadrant 19.

Fitted loosely within the sleeve 15 is a sleeve 20, extending through the yoke 14 and having a collar 21 at its lower end. The sleeve 20 projects above the disk 16 and has rigidly secured thereto a yoke 22. Said yoke carries a spring-pawl 23, which coacts with the orifices of the disk 16, and in this manner the yoke 22 may be turned around the axis of the sleeves 15 and 20, so as to occupy any desired position, and the said yoke may be held by the parts 22 and 16 before described. The spring-dog 23 is connected with an elbow-lever 24, which in turn has connection with a finger-lever 25, mounted on an arm 26, fastened to the yoke 22, thus facilitating the operation of the dog. The said yoke 22 carries rigidly a horizontal shaft 27, and, as best shown in Fig. 3, said shaft has loosely mounted thereon a yoke 28, normally disposed horizontally. To said yoke 28 is attached an arm 29, carrying a dog 30 of any suitable form, this dog coacting with a rigid quadrant 31, securely fastened to one end of the shaft 27. By means of these devices the yoke 28 may be adjusted around the axis of the shaft 27 and held at any desired adjustment within the range of the quadrant 31. Fastened securely to the yoke and projecting outward therefrom is a sleeve 32, to the outer end of which is attached a disk 33, similar to the disk 16 before described. Within the sleeve 32 is loosely arranged a sleeve 34, having at its inner end a collar 35, engaging the yoke 28, and the outer end of the sleeve projects beyond the sleeve 33 and carries a yoke 36, so that said yoke may be turned, with the sleeve 34, around the axes of the concentric sleeves 32 and 34. A dog 37 is carried by the yoke 36 and coacts with the orifices in the disk 33. Said dog is connected with an elbow-lever 38, and this elbow-lever has suitable connection with a finger-lever 39, mounted on an arm 40, which in turn is attached securely to the yoke 36. In this manner the yoke 36 may be adjusted as described and held in the desired position.

41 indicates the primary movement shaft of the reel mechanism, which extends at right angles to the shaft 12 and carries a bevel-gear 42, in mesh with a gear 43, loosely mounted on said shaft 12. The gear 43 is also in mesh with a gear 44, carried at the lower end of a shaft 45, which is passed loosely through the inner sleeve 20, as best shown in Fig. 2. This shaft 45 projects up into the yoke 22 and there carries fast a bevel-gear 46. The gear 46 meshes with a gear 47, loosely mounted on the shaft 27, and is also meshed with a gear 48, secured to a horizontal shaft 49, which runs through the sleeves 32 and 34. The outer end of the shaft 49 carries a bevel-gear 50, and this gear is meshed with a corresponding gear 51, securely fastened on a sleeve 52. Said sleeve 52 is mounted horizontally in the yoke 36 and has secured therein by a suitable key 53 the shaft 54 of the reel, said shaft extending horizontally and transversely of the machine to one side thereof when the reel mechanism is in operative position. It will thus be seen that revoluble movement is transmitted to the shaft 54 from the shaft 41 by means of the gear elements described and that these movements are independent of the various adjustments of the supporting parts.

At the outer portion of the shaft 54, as best shown in Figs. 5 and 6, two hubs or collars 55 are secured, and to said collars are pivoted radial arms 56. Said arms carry at their outer ends the blades 57 of the reel, which are pivoted to the arms and when in active position lie as shown in Fig. 5. The blades 57 and arms 56 are, however, capable of swinging inward, the blades having a parallel movement and when folded lying snugly against the shaft 54. This is effected by means of a runner 58, mounted on the shaft 54 and having connection by bars 59 with the outer arms 56. To said runner 58 is connected a collar 60, joined to a link 61, which passes inward and is pivoted to a lever 62. Said lever is suitably fulcrumed on the yoke 28, and by operating this lever the runner 58 may be operated, and thus the reel may be folded or expanded, as desired.

It will be seen that by means of the mechanism as before described I am enabled to mount the reel so that it may be adjusted readily to occupy any position desired, either to accommodate the lay of the land or condition of the grain, and also swing the shaft 54 back into position longitudinally of the machine, thus moving the reel out of the way when it is not being operated, and by folding the reel through the action of the parts 56 and 57, as before explained, the reel may be made to lie snugly against the side of the harvester. This construction also facilitates the compact folding of the parts to enable them to be shipped from one point to another. The reel while useful on harvesters of various sorts is particularly useful in connection with the harvester disclosed in my copending application above referred to.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of a mounted sleeve, a second sleeve loosely mounted in the first sleeve, a yoke carried by the second sleeve, means for releasably holding the two sleeves against independent movement, a shaft mounted in the yoke, a reel carried by the shaft, a second shaft extending through the interior of said sleeves, and gearing connecting the two shafts.

2. The combination with a reel and its shaft, of a yoke arranged to support the same, a sleeve to which said yoke is fixed, a second sleeve through which the first-named sleeve is passed, means for releasably holding the two sleeves against independent movement, and means extending through said sleeves for driving the reel.

3. The combination with a reel and its shaft, of a yoke arranged to support the same, a sleeve to which said yoke is fixed, a second sleeve through which the first-named sleeve is passed, means for releasably holding the two sleeves against independent movement, means extending through said sleeves for driving the reel, the said means for releasably holding the two sleeves comprising an orificed disk on the outer sleeve, a dog mounted on the yoke and coacting with the disk, and means for operating the dog.

4. The combination with a reel, of a yoke mounting the same, a sleeve to which said yoke is fixed, a second sleeve through which the first-named sleeve is passed, means for releasably holding the two sleeves against independent movement, a yoke connected to the second sleeve, a shaft extending through said sleeves, gearing connecting the shaft with the reel to drive the latter from the shaft, a third yoke on which the second-named yoke is mounted to swing, a sleeve attached to the third yoke, a shaft extending through said sleeve, gearing connecting the shaft with the shaft of the two first-named sleeves, a fourth sleeve through which the third sleeve is loosely passed, means for releasably holding the third and fourth sleeves against independent movement, a pivotally-mounted yoke to which the fourth sleeve is attached, means for adjustably holding said yoke and the fourth-named sleeve, and means for driving the second-named shaft independently of the adjustment of the said third sleeve.

5. The combination with a reel, of means for mounting the same, a yoke on which said means are mounted, a sleeve to which the yoke is attached, a second sleeve in which the first-named sleeve is mounted to turn, means for releasably holding the said sleeves against independent movement, means extending through the sleeves for driving the reel, means for mounting the said sleeves to swing, and devices for adjustably holding the sleeves in the desired position.

6. The combination with a reel, of means for mounting the same, a yoke on which said means are mounted, a sleeve to which the yoke is attached, a second sleeve in which the first-named sleeve is mounted to turn, means for releasably holding the said sleeves against independent movement, means extending through the sleeves for driving the reel, means for mounting the said sleeves to swing, and devices for adjustably holding the sleeves in the desired position, said devices comprising a toothed quadrant, and a dog mounted on the outer of said sleeves and coacting with the quadrant.

7. The combination with a reel, of a member arranged to mount the same, a sleeve to which said member is fixed, a second sleeve through which the first-named sleeve is passed, means for releasably holding the two sleeves against independent movement, and means extending through said sleeves and having connection with the reel, to drive the same.

8. The combination with a reel, of a member arranged to mount the same, a sleeve to which said member is fixed, a second sleeve through which the first-named sleeve is passed, means for releasably holding the two sleeves against independent movement, means extending through the sleeves and having connection with the reel, to drive the same, and means for mounting said second-named sleeve to swing.

9. The combination with a reel, of a member arranged to mount the same, a sleeve to which said member is attached, a second sleeve through which the first-named sleeve is passed, means for releasably holding the two sleeves against independent movement, means extending through said sleeves and having connection with the reel to drive the same, and means for mounting the sleeves to swing around either of two crossing axes.

10. The combination of a reel, means for mounting the same, a tubular member movably carrying said means, means for releasably holding the tubular member and said means against independent movement, and means for mounting said tubular member to swing.

11. The combination of a reel, means for mounting the same, a tubular member movably carrying said means, means for releasably holding the tubular member and said means against independent movement, and means for mounting said tubular member to swing around either of two crossing axes.

12. The combination of a reel, means for mounting the same, a member in which said means are mounted to turn, means for releasably holding said member and said means against independent movement, a second member on which the first-named member is mounted to swing around either of two crossing axes, means for mounting the second member to swing, and means for releasably holding said second member.

13. The combination of a reel, means for mounting the same, a member in which said means are arranged to turn around a horizontal axis, means for releasably holding said member and said means against independent movement, a second member, means for mounting the first member on the second member to swing around horizontal and vertical axes, and means for releasably holding the second member against said swinging movements.

14. The combination of a reel, means for mounting the same, a member in which said means are arranged to turn around a horizontal axis, means for releasably holding said member and said means against independent movement, a second member, means for mounting the first member on the second member to swing around horizontal and vertical axes, means for releasably holding the second member against said swinging movements, said means for mounting the second member allowing the same to swing around a horizontal axis, and means for releasably holding said member against the said swinging movement.

15. The combination of a shaft, means for revolubly mounting the same, two hubs secured to the shaft, arms pivotally mounted to the hubs, reel-blades pivoted to the arms, links pivoted to the arms of one hub and extending past the arms of the other hub, a runner mounted to slide on the shaft and pivoted to said links, a collar having revoluble connection with the runner, and an operating means connected to the collar.

16. The combination of a shaft, means for revolubly mounting the same, two hubs secured to the shaft, arms pivotally mounted to the hubs, reel-blades pivoted to the arms, links pivoted to the arms of one hub and extending past the arms of the other hub, a runner mounted to slide on the shaft and pivoted to said links, a collar having revoluble connection with the runner, and an operating means connected to the collar, the said means for mounting the shaft comprising a sleeve, means for removably securing the shaft in the sleeve, and boxes revolubly carrying the sleeve.

17. The combination of a reel, horizontally-extending supporting means to which the reel is connected to permit vertical adjustment thereof, and a vertically-extending supporting means to which the horizontal supporting means are connected, the vertical supporting means being turnable around a vertical axis to permit of horizontal adjustment of the reel and horizontally-extending supporting means.

18. The combination of a reel, horizontally-extending supporting means to which the reel is connected to permit vertical adjustment thereof, and a vertically-extending supporting means to which the horizontal supporting means are connected, the vertical supporting means being turnable around a vertical axis to permit of horizontal adjustment of the reel and horizontally-extending supporting means, both of said supporting means comprising tubular members and reel-driving mechanism, having elements extending centrally through said tubular members.

19. The combination of a reel, a vertically-extending hollow supporting part, a horizontally-extending hollow supporting part, the horizontally-extending supporting part having connection with the vertically-extending supporting part to enable the former to swing in a horizontal plane around a vertical axis, and the reel having connection with the horizontally-extending supporting part, and means for driving the reel comprising transmitting elements passed through said hollow supporting parts.

In testimony whereof I have signed my name to this specification in the presence of two subscribing witnesses.

CHARLES O. WYMAN.

Witnesses:
J. C. HERMAN ENGEL,
G. H. WYMAN.